（12) United States Patent
Fujino et al.

(10) Patent No.: US 12,233,726 B2
(45) Date of Patent: Feb. 25, 2025

(54) CHARGING CONTROL DEVICE

(71) Applicant: SUBARU CORPORATION, Tokyo (JP)

(72) Inventors: Takahito Fujino, Tokyo (JP); Kohei Nanbu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 690 days.

(21) Appl. No.: 17/534,098

(22) Filed: Nov. 23, 2021

(65) Prior Publication Data

US 2022/0185128 A1 Jun. 16, 2022

(30) Foreign Application Priority Data

Dec. 15, 2020 (JP) ................. 2020-207822

(51) Int. Cl.
*H02J 7/00* (2006.01)
*B60L 50/64* (2019.01)
*B60L 53/16* (2019.01)
*B60L 58/12* (2019.01)

(52) U.S. Cl.
CPC ............... *B60L 53/16* (2019.02); *B60L 50/64* (2019.02); *B60L 58/12* (2019.02); *H02J 7/007* (2013.01)

(58) Field of Classification Search
USPC ....................................................... 320/109
See application file for complete search history.

(56) References Cited

U.S. PATENT DOCUMENTS

| 2017/0149255 A1* | 5/2017 | Garcia-Acosta | .......... H02J 7/04 |
| 2020/0076020 A1* | 3/2020 | Ogaki | ................. H01M 10/655 |
| 2021/0300197 A1* | 9/2021 | Yi | ............................ B60L 58/26 |

FOREIGN PATENT DOCUMENTS

JP 2010-252474 A 11/2010

* cited by examiner

*Primary Examiner* — Samuel Berhanu
(74) *Attorney, Agent, or Firm* — Rimon P.C.

(57) ABSTRACT

A charging control device includes an acquirer, a first deriver, a second deriver, and an executer. The acquirer is configured to acquire battery information regarding a battery. The first deriver is configured to derive an estimated charging time estimated as time to be taken to charge the battery in external charging of the battery. The estimated charging time is derived based on the battery information. The second deriver is configured to derive a difference time between the estimated charging time and a set charging time set as time for which the external charging of the battery is to be performed. The executer is configured to perform the external charging of the battery such that the battery is to be cooled throughout the difference time and the battery is to be charged throughout the estimated charging time.

13 Claims, 6 Drawing Sheets

CHARGING CONTROL DEVICE

CROSS-REFERENCE TO RELATED APPLICATIONS

The present application claims priority from Japanese Patent Application No. 2020-207822 filed on Dec. 15, 2020, the entire contents of which are hereby incorporated by reference.

BACKGROUND

The disclosure relates to a charging control device.

To date, batteries have been used as a power source in various apparatuses, such as electric vehicles. A chargeable and dischargeable battery such as a lithium-ion battery is repeatedly charged through external charging. Such a battery deteriorates in the course of use. Hence, technique for appropriately controlling battery charging in consideration of battery deterioration has been proposed as disclosed, for example, in Japanese Unexamined Patent Application Publication No. 2010-252474.

SUMMARY

An aspect of the disclosure provides a charging control device including an acquirer, a first deriver, a second deriver, and an executer. The acquirer is configured to acquire battery information regarding a battery. The first deriver is configured to derive an estimated charging time estimated as time to be taken to charge the battery in external charging of the battery. The estimated charging time is derived based on the battery information. The second deriver is configured to derive a difference time between the estimated charging time and a set charging time set as time for which the external charging of the battery is to be performed. The executer is configured to perform the external charging of the battery such that the battery is to be cooled throughout the difference time and the battery is to be charged throughout the estimated charging time.

An aspect of the disclosure provides a charging control device including circuitry. The circuitry is configured to acquire battery information regarding a battery. The circuitry is configured to derive an estimated charging time estimated as time to be taken to charge the battery in external charging of the battery. The estimated charging time is derived based on the battery information. The circuitry is configured to derive a difference time between the estimated charging time and a set charging time set as time for which the external charging of the battery is to be performed. The circuitry is configured to perform the external charging of the battery such that the battery is to be cooled throughout the difference time and the battery is to be charged throughout the estimated charging time.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

The deterioration of a battery leads to a decrease of the maximum capacity that is the maximum value of the chargeable electricity of the battery. In a deteriorated battery, it thus takes a shorter time for a remaining battery capacity to reach the maximum capacity in external charging than in a brand-new battery. In other words, the remaining battery capacity reaches the maximum capacity earlier in the deteriorated battery. A duration in which the state of charge (SOC) of the battery is kept high is increased accordingly, and battery deterioration is thus accelerated easily. The battery deterioration also leads to an increase in the resistance of the battery, thus having a high possibility of heat generation from the battery in the external charging. This also causes the battery deterioration to be accelerated easily. The deceleration of the battery deterioration is thus desired.

According to an embodiment of the disclosure, it is desirable to provide a charging control device capable of decelerating battery deterioration.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Power System Configuration

The configuration of a power system 1 according to the embodiment of the disclosure will be described with reference to FIGS. 1 and 2.

Figure 1:
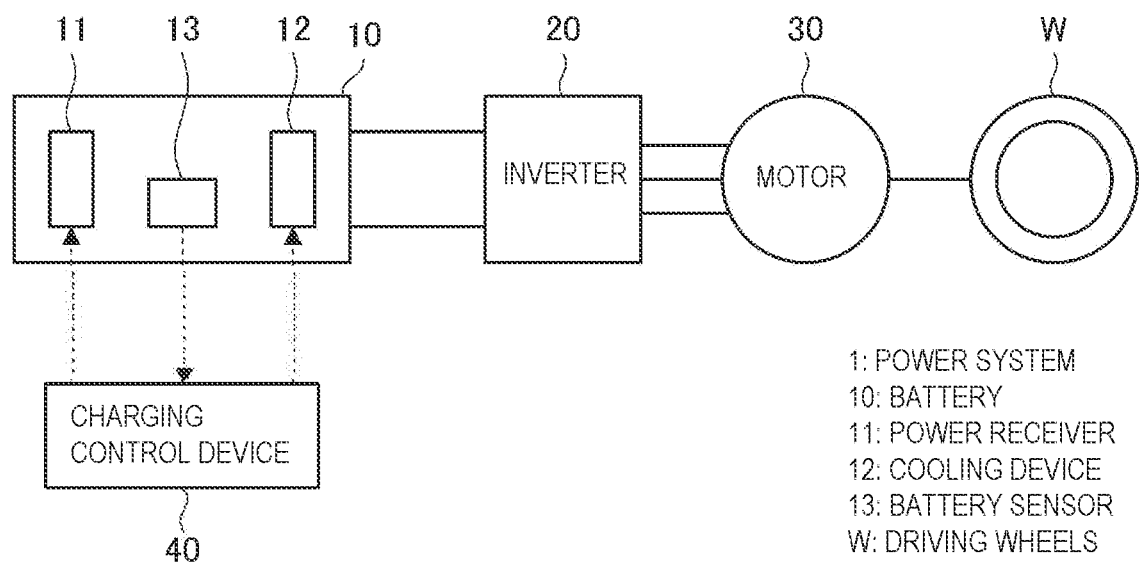
FIG. 1 is a diagram schematically illustrating the configuration of a power system according to an embodiment of the disclosure.

FIG. 1 is a diagram schematically illustrating the configuration of the power system 1. As illustrated in FIG. 1, the power system 1 includes a battery 10, an inverter 20, a motor 30, and a charging control device 40.

The power system 1 is installed in an electric vehicle such as an electric vehicle (EV) or a hybrid electric vehicle (HEV) and is used to supply power to devices in the vehicle. The motor is used as a vehicle driving source. However, the power system 1 may be installed in an apparatus other than a vehicle.

The battery 10 is a secondary battery and is chargeable and dischargeable. The battery 10 is coupled to the motor 30 with the inverter 20 interposed therebetween. The battery 10 accumulates power to be supplied to the motor 30. A secondary battery such as a lithium-ion battery or a nickel-hydrogen battery is used as the battery 10.

The battery 10 includes a power receiver 11, a cooling device 12, and a battery sensor 13.

The power receiver 11 is capable of receiving power transmitted from an external charger outside the vehicle in which the power system 1 is installed. The external charger has an external power supply outside the vehicle and a charging plug connected with the external power supply. The charging plug of the external charger is connected with the power receiver 11 of the vehicle being parked, and the battery 10 is charged by using external power supplied from the external power supply via the power receiver 11. Charging of the battery 10 with the external charger as described above is referred to as "external charging".

As described above, in a plug-in state, that is, in the physical connection with the charging plug, the power receiver 11 is able to receive power transmitted from the external power supply. However, the power receiver 11 may receive power transmitted from the external power supply in a contactless manner. For example, magnetic resonance or electromagnetic induction can be used for contactless power transmission.

The cooling device 12 has a function of cooling the battery 10. For example, the cooling device 12 may be a water cooling device. For example, a device including piping and a pump is used as the cooling device 12. The piping is disposed near the cells of the battery 10 for circulating cooling water, and the pump delivers the cooling water in the piping. In this case, the battery 10 is cooled by using heat exchange between the cooling water and the cells. The cooling device 12 may also be, for example, an air cooling device. For example, a device including a fan that blows air around the cells of the battery 10 is used as the cooling device 12. In this case, the battery is cooled by using heat exchange between the air flowing around each cell and the cell.

The battery sensor 13 detects the remaining capacity of the battery 10 and battery temperature that is the temperature of the battery 10 and outputs the remaining capacity and the battery temperature to the charging control device 40. The information output from the battery sensor 13 is included in battery information (described later).

The inverter 20 is a power converter capable of power conversion between direct current (DC) and alternating current (AC). The inverter 20 includes, for example, a multi-phase bridge circuit. The inverter 20 is capable of converting DC power supplied from the battery 10 to AC power and supplying the AC power to the motor 30. The inverter 20 is provided with a switching element. The operations of the switching element are controlled, and power supply between the battery 10 and the motor 30 is controlled accordingly.

The motor 30 is capable of outputting power to drive driving wheels W of the vehicle. The motor 30 is, for example, a polyphase (for example, three-phase) AC motor and generates power by using electric power supplied from the battery 10 via the inverter 20. The motor 30 may also have a function (regeneration function) as an electric generator that generates electric power by using rotational energy of the driving wheels W at the slowdown of the vehicle. In this case, AC power regenerated by the motor 30 is converted to DC power by the inverter 20 and then is supplied to the battery 10.

The charging control device 40 includes a central processing unit (CPU) serving as an arithmetic processing unit, a read only memory (ROM) serving as a storage element that stores programs, computing parameters, and the like used by the CPU, a random access memory (RAM) serving as a storage element that temporarily stores parameters varying as appropriate in running the CPU, and other components.

Figure 2:
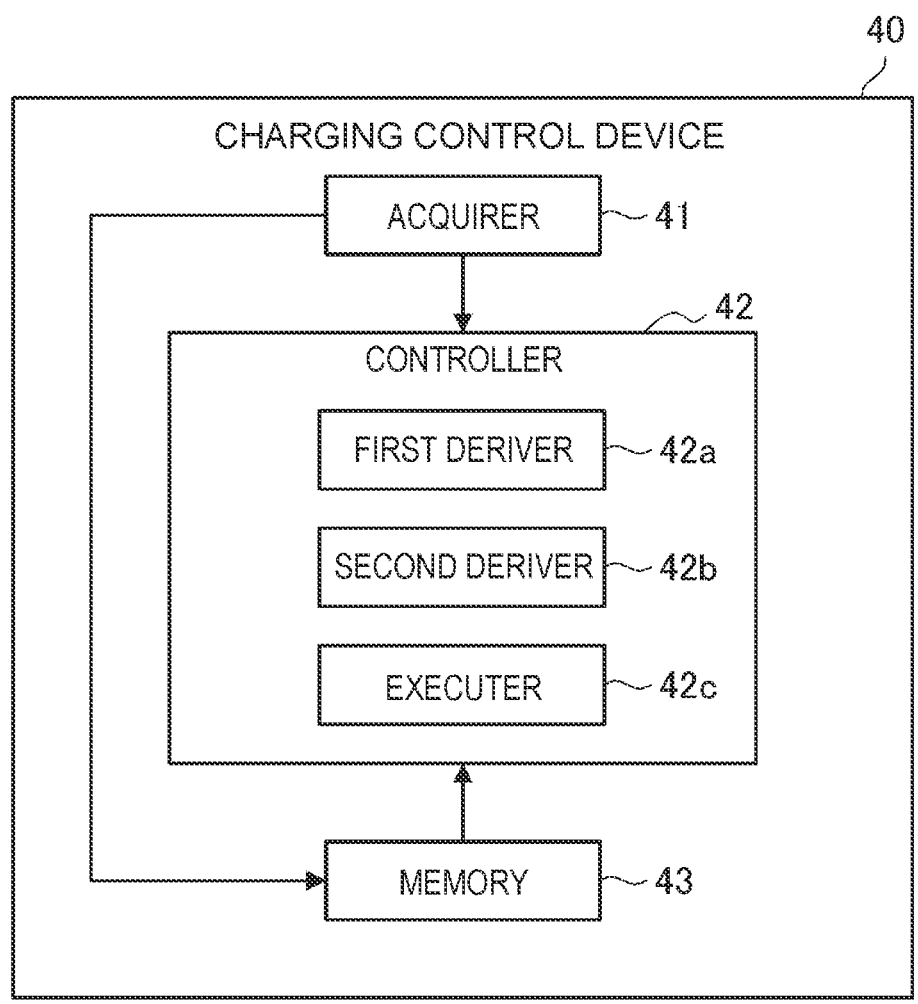
FIG. 2 is a block diagram illustrating an example of the functional configuration of a charging control device according to the embodiment of the disclosure.

FIG. 2 is a block diagram illustrating an example of the functional configuration of the charging control device 40. As illustrated in FIG. 2, the charging control device 40 includes, for example, an acquirer 41, a controller 42, and a memory 43. The acquirer 41 acquires various pieces of information to be used in processes executed by the controller 42. The acquirer 41 outputs the acquired information to the controller 42 and the memory 43. For example, the acquirer 41 acquires information from the battery sensor 13. Acquiring information includes generating information. The acquirer 41 can thus generate secondary information by using the information acquired from the battery sensor 13.

The acquirer 41 particularly acquires battery information as information regarding the battery 10. The battery information includes information regarding the external charging of the battery 10 performed using the external charger, in addition to the remaining capacity and the battery temperature of the battery 10 detected by the battery sensor 13. The details of the battery information will be described later.

The controller 42 executes various processes regarding the external charging of the battery 10. The controller 42 includes a first deriver 42a, a second deriver 42b, and an executer 42c.

Based on the battery information, the first deriver 42a derives an estimated charging time for the battery 10. The estimated charging time is estimated as time taken to charge the battery 10 in the external charging.

The second deriver 42b derives a difference time between a set charging time for the battery 10 and the estimated charging time. The set charging time has been set as a period of time in which the external charging of the battery 10 is performed. In one example, the set charging time is set as time taken to fully charge the battery 10 in a brand-new state (that is, time taken for the battery 10 to be in a state where the remaining capacity is the maximum capacity) regardless of the remaining capacity of the battery 10.

The executer 42c performs the external charging of the battery 10. In one example, the executer 42c controls the operations of the power receiver 11 of the battery 10 in the external charging and can thereby supply external power from the external charger to the battery 10 and thus charge the battery 10. In addition, the executer 42c controls the operations of the cooling device 12 of the battery 10 in the external charging and can thereby cool the battery 10.

The memory 43 stores information to be used for the various processes executed by the controller 42. The memory 43 particularly stores, as such information, various pieces of battery information.

The charging control device 40 communicates with the devices in the power system 1, as described above. The communication between the charging control device 40 and the devices is implemented, for example, through controller area network (CAN) communication.

A function of the charging control device 40 according to this embodiment may be divided to be implemented by two or more control devices. Multiple functions of the charging control device 40 may be implemented by one control device. In the case where a function of the charging control device 40 is implemented by the two or more control devices, the control devices may be coupled to each other via a communication bus such as the CAN.

The executer 42c of the charging control device 40 performs the external charging of the battery 10 in this embodiment as described above. The executer 42c performs the external charging based on the estimated charging time derived by the first deriver 42a and the difference time derived by the second deriver 42b. The deterioration of the battery 10 is decelerated accordingly. The details of the processes by the charging control device 40 will be described later.

Operations of Charging Control Device

The operations of the charging control device 40 according to the embodiment of the disclosure will be described with reference to FIGS. 3 to 6.

Figure 3:
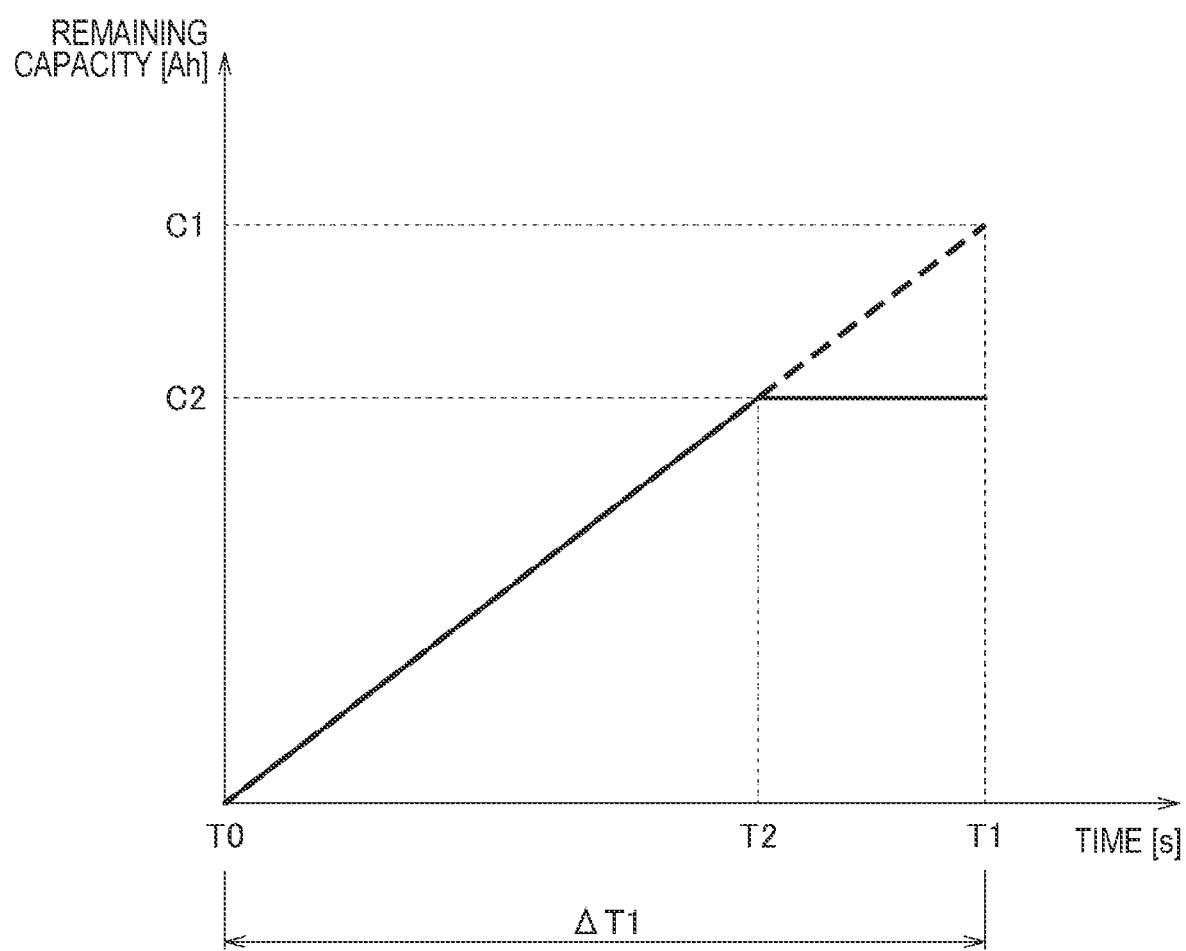
FIG. 3 is a graph illustrating examples of change in the remaining capacity of a battery in external charging according to a comparative example.
Figure 4:
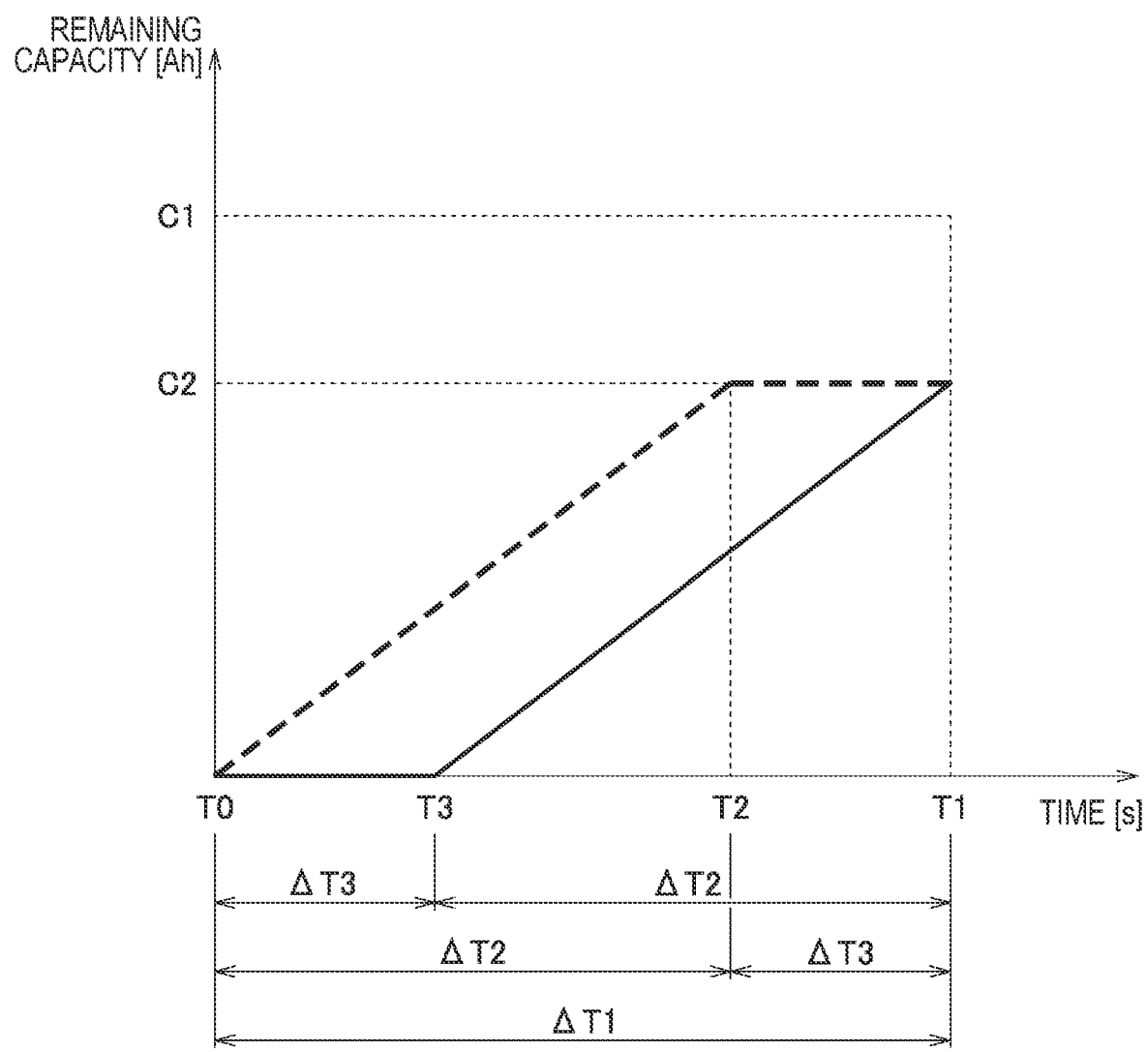
FIG. 4 is a graph illustrating an example of change in the remaining capacity of a battery in external charging according to the embodiment of the disclosure.

In this embodiment, the executer 42c performs the external charging of the battery 10 such that the battery 10 is cooled throughout the difference time and the battery 10 is charged throughout the estimated charging time. Hereinafter, an overview of a difference between external charging according to a comparative example and the external charging according to this embodiment will be described with reference to FIGS. 3 and 4. For easy understanding, FIGS. 3 and 4 illustrate examples of change in the remaining capacity in the external charging started with a remaining capacity of 0 Ah. However, actually, the remaining capacity may have a value other than 0 Ah at the start of the external charging.

FIG. 3 is a graph illustrating examples of change in the remaining capacity of a battery 10 in the external charging according to a comparative example. In FIG. 3, the vertical axis represents a remaining capacity [Ah], and the horizontal axis represents time [s]. The broken line in FIG. 3 represents change in the remaining capacity of the battery 10 in a brand-new state. The solid line in FIG. 3 represents change in the remaining capacity of the battery 10 in a deteriorated state.

In the comparative example, the battery 10 is continuously charged throughout the external charging. In the examples illustrated in FIG. 3, the charging of the battery 10 is started when the remaining capacity is 0 Ah at a start time point T0 in the external charging. The external charging ends at an end time point T1 in the external charging, that is, at a time point when a set charging time ΔT1 has elapsed since the start time point T0, and thus the charging of the battery 10 is terminated. In FIG. 3, as represented by the broken line, the maximum capacity of a brand-new battery 10 is a capacity C1. After the external charging of the brand-new battery 10 is started when the remaining capacity is 0 Ah, the battery 10 is fully charged at the end time point T1.

The deterioration of the battery 10 leads to a decrease in the maximum capacity of the battery 10. The maximum capacity of the deteriorated battery 10 is thus a capacity C2 lower than the capacity C1, as represented by the solid line in FIG. 3. After the external charging is started when the remaining capacity is 0 Ah, the deteriorated battery 10 is fully charged at a time point T2 earlier than the end time point T1. The SOC of the battery 10 is thus kept at an about 100% state from the time point T2 to the time point T1.

In the comparative example as described above, the deterioration of the battery 10 leads to an increase of the duration of a high SOC of the battery 10 in the external charging. The deterioration of the battery 10 is thus accelerated easily. Further, the deterioration of the battery 10 leads to an increase in the resistance of the battery 10, thus having a high possibility of heat generation from the battery 10 in the external charging. This also causes the deterioration of the battery 10 to be accelerated easily.

FIG. 4 is a graph illustrating an example of change in the remaining capacity of a battery 10 in the external charging according to this embodiment. In FIG. 4, like FIG. 3, the vertical axis represents a remaining capacity [Ah], and the horizontal axis represents time [s]. The broken line in FIG. 4 represents change in the remaining capacity of the deteriorated battery 10 in the comparative example (that is, the change represented by the solid line in FIG. 3). The solid line in FIG. 4 represents change in the remaining capacity of the battery 10 in a deteriorated state in this embodiment. The maximum capacity of the battery 10 is thus the capacity C2 in the example represented by the solid line in FIG. 4.

In this embodiment, the first deriver 42a derives an estimated charging time ΔT2 estimated as time taken to charge the battery 10 in the external charging. The estimated charging time ΔT2 corresponds to the period of time from the time point T0 to the time point T2 represented by the broken line in the comparative example in FIG. 4. The second deriver 42b derives a difference time ΔT3 between the set charging time ΔT1 and the estimated charging time ΔT2. The executer 42c starts cooling of the battery 10 at the start time point T0 in the external charging. At a time point T3 at which the difference time ΔT3 has elapsed since the start time point T0, the executer 42c terminates cooling of the battery 10 and starts charging of the battery 10. In response to this, the remaining capacity of the battery 10 starts increasing at the time point T3 as represented by the solid line in FIG. 4. Thereafter, at the time point T1 when the estimated charging time ΔT2 has elapsed since the time point T3, the external charging is terminated, and the charging of the battery 10 is terminated. The battery 10 is thus fully charged at the end time point T1 in the external charging as represented by the solid line in FIG. 4.

In this embodiment as described above, the battery 10 is cooled throughout the difference time ΔT3 and is charged throughout the estimated charging time ΔT2. Accordingly, an increase of the duration of a high SOC of the battery 10 due to the deterioration of the battery 10 can be reduced, and the battery 10 can be fully charged within the set charging time ΔT1. Further, cooling is performed on the deteriorated battery 10 in the external charging, and thus heat generation from the deteriorated battery 10 can be reduced. According to this embodiment, the deterioration of the battery 10 can be decelerated.

The example in which the battery 10 is cooled before the battery 10 is charged in the external charging has been described; however, timing of cooling the battery 10 in the external charging is not limited to that in the example above. For example, the executer 42c may cool the battery 10 after charging the battery 10. For example, the executer 42c may charge the battery 10 separately in two periods before and after cooling the battery 10. In the external charging, the total cooling time for the battery 10 is simply the difference time, and the total charging time for the battery 10 is simply the estimated charging time. However, in some embodiments, to effectively reduce the heat generation during the charging of the battery 10, the battery 10 is cooled before the charging to lower the battery temperature.

Hereinafter, examples of processes, related to the external charging, performed by the charging control device 40 according to this embodiment will be described with reference to FIGS. 5 and 6. The charging control device 40 executes a learning process and a charging process illustrated in FIG. 5 and FIG. 6 respectively. The external charging of the battery 10 is mainly implemented in the charging process. The learning process is a process for learning in advance of some of the battery information to be used in the charging process. Hereinafter, the learning process will be described with reference to FIG. 5 and then the charging process will be described with reference to FIG. 6.

Figure 5:
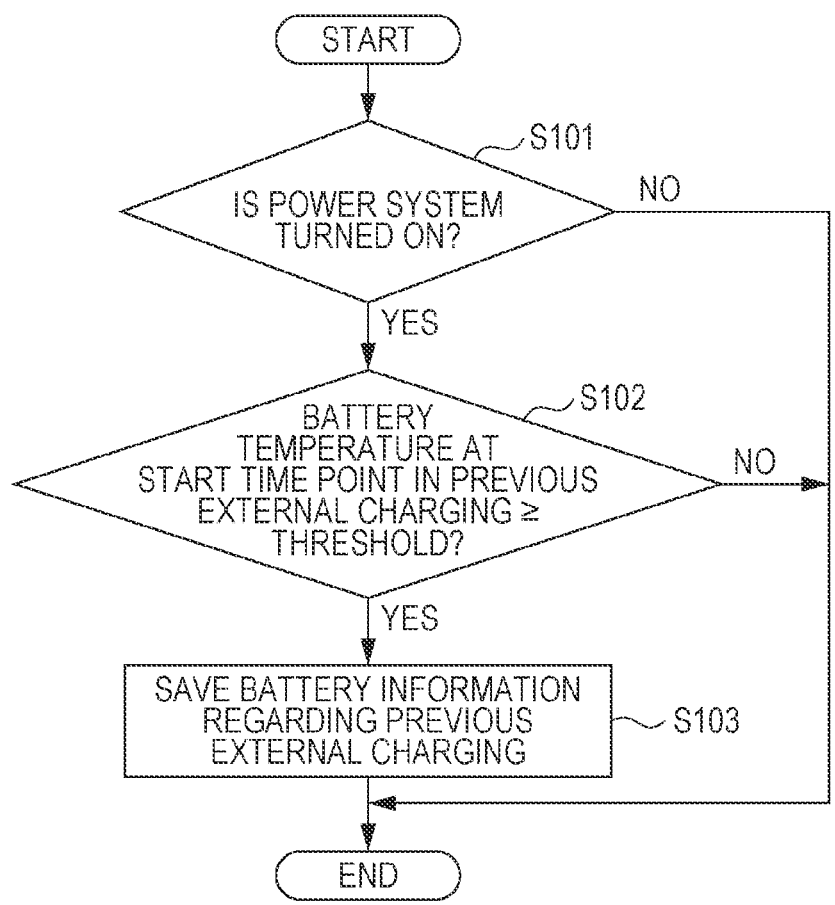
FIG. 5 is a flowchart of an example of a learning process by the charging control device according to the embodiment of the disclosure.

FIG. 5 is a flowchart of an example of the learning process performed by the charging control device 40. The control flow illustrated in FIG. 5 is repeatedly started, for example, after the end of the control flow at predetermined intervals.

After the control flow illustrated in FIG. 5 is started, the charging control device 40 first determines in step S101 whether the power system 1 is turned on. In one example, the charging control device 40 determines whether the state of the power system 1 is changed from an off state to the on state. For example, if the charging control device 40 receives, from the ignition switch of the vehicle, a signal indicating that the ignition switch is on, the charging control device 40 determines that the power system 1 is turned on.

If it is determined that the power system 1 is turned on in step S101 (YES in step S101), the process proceeds to step S102. In contrast, if it is not determined that the power system 1 is turned on in step S101 (NO in step S101), the control flow illustrated in FIG. 5 is terminated.

If the determination in step S101 results in YES, the charging control device 40 determines in step S102 whether the battery temperature at the start time point in the previous external charging is higher than or equal to a threshold. The threshold is set at such a low temperature that leads to a judgement that the battery 10 is not to be cooled (for example, 25° C.)

If it is determined that the battery temperature at the start time point in the previous external charging is higher than or equal to the threshold in step S102 (YES in step S102), the process proceeds to step S103, and battery information regarding the previous (that is, the most recent) external charging is saved. In contrast, if it is determined that the battery temperature at the start time point in the previous external charging is lower than the threshold in step S102 (NO in step S102), the control flow illustrated in FIG. 5 is terminated.

As later described, the external charging is performed in the charging process illustrated in FIG. 6 such that the battery 10 is cooled if the battery temperature is higher than or equal to the threshold. In other words, if the battery temperature is higher than or equal to the threshold at the start time point in the previous external charging, it can be determined that the cooling of the battery 10 has been performed in the previous external charging. Step S103 (that is, saving the battery information regarding the previous external charging) in FIG. 5 is thus performed if the battery 10 has been cooled in the previous external charging. This enables the use of the newest battery information in cooling the battery 10 in the next external charging.

If the determination in step S102 results in YES, the memory 43 saves the battery information regarding the previous (that is, the most recent) external charging in step S103, and the control flow illustrated in FIG. 5 is terminated.

The memory 43 has a specific memory area where, for example, the battery information is registered and temporarily stores various pieces of battery information regarding the previous external charging in an area different from the specific memory area. In step S103, the memory 43 saves the various pieces of battery information regarding the previous external charging in the specific memory area. The battery information regarding the previous external charging is thus learned.

The battery information regarding the previous external charging saved in step S103 is acquired by the acquirer 41. The acquirer 41 acquires the battery information regarding the previous external charging based on, for example, the charging result in the previous external charging. The battery information regarding the previous external charging includes, for example, information indicating the type of the external charger used in the previous external charging, the maximum capacity of the battery 10 in the previous external charging, a charging amount as a total amount of power charged in the battery 10 in the previous external charging, and actual charging time in the previous external charging.

The actual charging time has a value indicating time actually taken to charge the battery 10, in other words, time from a time point when the charging is started to a time point when the battery 10 is fully charged. The charging amount is acquirable based on, for example, the actual charging time and a current value (the value of current) set for the external charger used. The maximum capacity of the battery 10 is acquirable based on, for example, a remaining capacity at the start of the previous external charging and the charging amount. In step S103, the memory 43 also stores information indicating a date when the battery information is saved.

Figure 6:
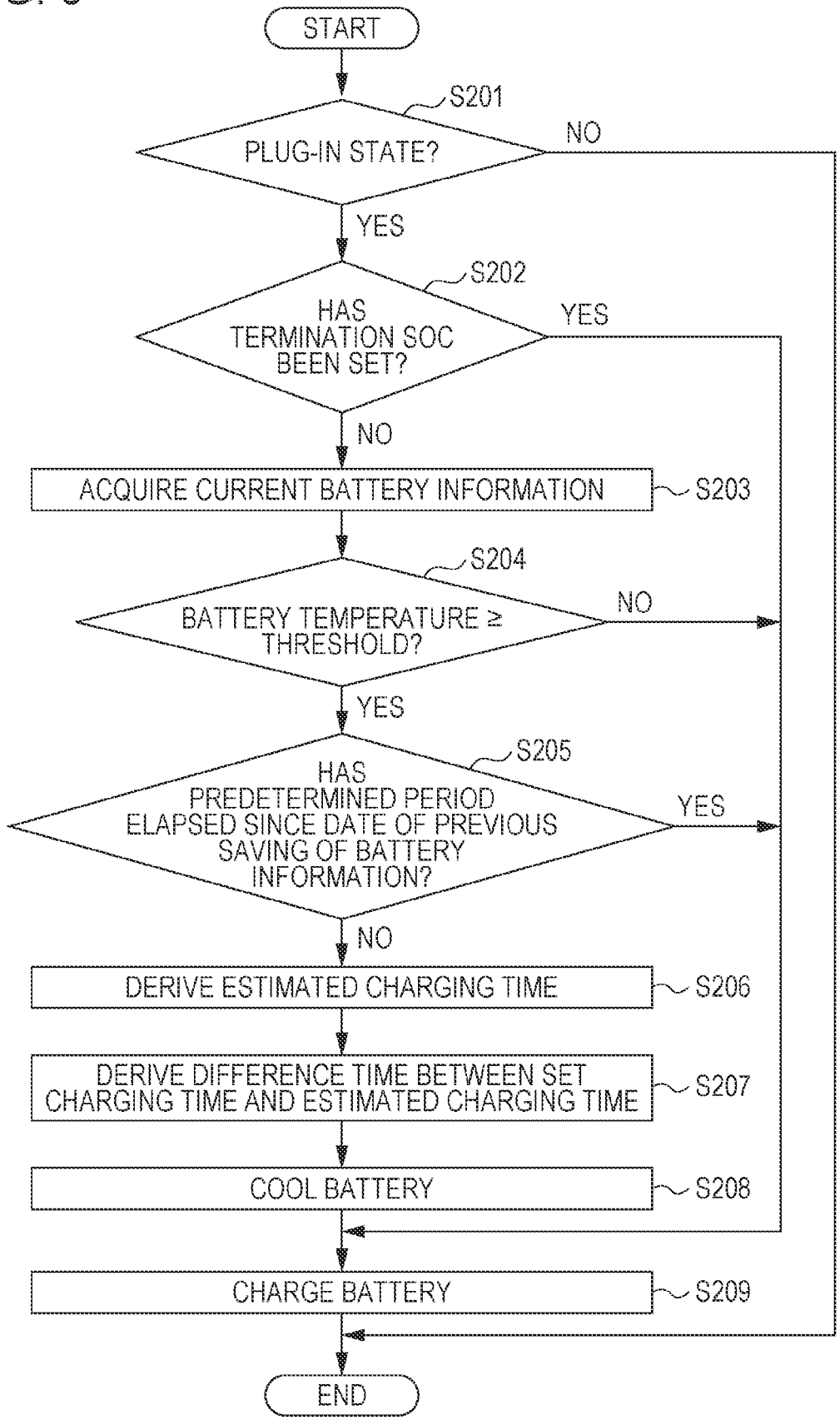
FIG. 6 is a flowchart of an example of a charging process by the charging control device according to the embodiment of the disclosure.

FIG. 6 is a flowchart of an example of the charging process by the charging control device 40. The control flow illustrated in FIG. 6 is repeatedly started, for example, after the end of the control flow at predetermined intervals.

After the control flow illustrated in FIG. 6 is started, the charging control device 40 first determines in step S201 whether the battery 10 is in the plug-in state. In the plug-in state, the power receiver 11 of the battery 10 is physically connected with the charging plug of the external charger as described above and is thus able to receive power.

If it is determined that the battery 10 is in the plug-in state in step S201 (YES in step S201), the process proceeds to step S202. In contrast, if it is determined that the battery 10 is not in the plug-in state in step S201 (NO in step S201), the control flow in FIG. 6 is terminated.

If the determination in step S201 results in YES, the charging control device 40 determines in step S202 whether a termination SOC has been set by a user. The termination SOC is a goal for terminating charging of the battery 10 in the external charging. If the termination SOC has been set by the user, the user desires the termination of the charging at a time point when the battery 10 is in the termination SOC in the external charging. If the termination SOC has not been set by the user, the charging control device 40 uses a value of 100% for the termination SOC.

If it is determined that the termination SOC has been set in step S202 (YES in step S202), the process proceeds to step S209 (described later), and then the battery 10 is charged. In contrast, if it is determined that the termination SOC has not been set in step S202 (NO in step S202), the process proceeds to step S203.

If the determination in step S202 results in NO, the acquirer 41 acquires current battery information (battery information at present) in step S203. The current battery information includes information indicating, for example, the type of the external charger to be used in external charging this time, the current remaining capacity of the battery 10, and the current battery temperature of the battery 10.

The current remaining capacity of the battery 10 is acquirable, for example, by charging the battery 10 in a short time. The acquirer 41 can also acquire information indicating a set current value (a value of current) set for the external charger, based on the information indicating the type of the external charger to be used in external charging this time. In step S203, the acquirer 41 also acquires information indicating the current date (date at present).

Subsequently to step S203, the charging control device 40 determines in step S204 whether the battery temperature of the battery 10 is higher than or equal to the threshold. As described above, the threshold is set at such a low temperature that leads to a judgement that the battery 10 is not to be cooled (for example, 25° C.). Accordingly, if the battery temperature is lower than the threshold, the battery 10 is not intended to be cooled. Hence, in the control flow illustrated in FIG. 6, if the battery temperature is lower than the threshold, the cooling of the battery 10 is omitted (described later), and thus undesired power consumption is reduced.

If it is determined that the battery temperature is higher than or equal to the threshold in step S204 (YES in step S204), the process proceeds to step S205. In contrast, if it is determined that the battery temperature is lower than the threshold in step S204 (NO in step S204), the process proceeds to step S209 (described later), and then the battery 10 is charged.

If the determination in step S204 results in YES, the charging control device 40 determines in step S205 whether a predetermined period has elapsed since the date of previous saving of the battery information. The date of previous saving denotes a date when step S103 in FIG. 5 is previously performed. The predetermined period is set to such a long period that leads to a judgment that the newest battery information is out-of-date information.

If it is determined in step S205 that the predetermined period has elapsed since the date of previous saving of the battery information (YES in step S205), the process proceeds to step S209 (described later), and then the battery 10 is charged. In contrast, if it is determined in step S205 that the predetermined period has not elapsed since the date of previous saving of the battery information (NO in step S205), the process proceeds to step S206.

If the determination in step S205 results in NO, the first deriver 42a derives the estimated charging time in step S206. The first deriver 42a derives the estimated charging time based on the battery information. The battery information used in the process of deriving the estimated charging time in step S206 includes, for example, the battery information acquired in step S103 in FIG. 5 and the battery information acquired in step S203 in FIG. 6.

For example, the first deriver 42a first calculates an estimated charging amount estimated as a charging amount of the battery 10 for external charging this time. Note that step S206 is performed after the determination in step S202 has resulted in NO, and thus the termination SOC has been set at 100%. The goal capacity of the battery 10 at the termination of charging is thus the maximum capacity of the battery 10. The first deriver 42a can thus calculate the estimated charging amount by subtracting the current remaining capacity of the battery 10 (that is, the remaining capacity of the battery 10 at the start time point in the external charging) from the current maximum capacity of the battery 10. The first deriver 42a can use, as the current maximum capacity of the battery 10, the maximum capacity of the battery 10 in the previous external charging, the maximum capacity being acquired in the learning process in FIG. 5.

The first deriver 42a then derives the estimated charging time by multiplying the actual charging time in the previous external charging by the ratio of the estimated charging amount to the charging amount in the previous external charging, the actual charging time and the charging amount being acquired in the learning process in FIG. 5. However, the process of deriving the estimated charging time from the estimated charging amount is not limited to the example above. For example, the first deriver 42a may derive the estimated charging time by dividing the estimated charging amount by the set current value.

As described above, the first deriver 42a can derive the estimated charging time based on the current maximum capacity of the battery 10 serving as the battery information. The first deriver 42a can thereby derive the estimated charging time appropriately based on the degree of deterioration of the battery 10. The lower the current maximum capacity of the battery 10, the shorter the estimated charging time derived by the first deriver 42a.

As described above, the first deriver 42a can derive the estimated charging time also based on the remaining capacity of the battery 10 serving as the battery information at the start time point in the external charging. The first deriver 42a can thereby derive the estimated charging time appropriately based on the state at the start time point of the battery 10 in the external charging. The lower the remaining capacity of the battery 10 at the start time point in the external charging, the longer the estimated charging time derived by the first deriver 42a.

In some embodiments, to perform deriving more appropriately, the first deriver 42a derives the estimated charging time based on both of the current maximum capacity of the battery 10 and the remaining capacity of the battery 10 at the start time point in the external charging. However, the first deriver 42a may derive the estimated charging time without using one of the current maximum capacity of the battery 10 and the remaining capacity at the start time point in the external charging.

Subsequently to step S206, the second deriver 42b derives a difference time between the set charging time and the estimated charging time in step S207. In one example, the second deriver 42b derives the difference time by subtracting the estimated charging time from the set charging time. The set charging time has been set for the external charger to be used in external charging this time. The second deriver 42b can thus decide the set charging time based on the type of the external charger to be used in external charging this time.

In step S208 subsequent to step S207, the executer 42c cools the battery 10 throughout the difference time derived in step S207. In one example, the executer 42c drives the cooling device 12 of the battery 10 throughout the difference time derived in step S207. Note that if the difference time derived in step S207 has a negative value because the estimated charging time is longer than the set charging time, the cooling of the battery 10 in step S208 is omitted.

Subsequently to step S208, the executer 42c charges the battery 10 in step S209, and the control flow illustrated in FIG. 6 is then terminated. In one example, if steps S206 and S207 have been performed, the executer 42c charges the battery 10 in step S209 throughout the estimated charging time derived in step S206.

If the determination in step S202 results in YES, steps S206 and S207 are not performed. In this case, in step S209, the executer 42c charges the battery 10, for example, until the remaining capacity of the battery 10 reaches the termination SOC. If the determination in step S204 results in NO, or if the determination in step S205 results in YES, steps S206 and S207 are not performed. In these cases, in step S209, the executer 42c charges the battery 10, for example, throughout the set charging time.

Examples of the processes by the charging control device 40 have heretofore been described with reference to FIGS. 5 and 6; however, the processes by the charging control device 40 are not limited to the examples above. For example, step S103 in the control flow in FIG. 5 is performed after the power system 1 is turned on but may be performed in the external charging (for example, after the termination of the external charging). In this case, step S103 in FIG. 5 is performed if the cooling of the battery 10 has been performed in the external charging.

Effects of Charging Control Device

The effects of the charging control device 40 according to the embodiment of the disclosure will be described.

In the charging control device 40 according to this embodiment, the first deriver 42a derives the estimated charging time estimated as the time taken to charge the battery 10 in the external charging, based on the battery information. The second deriver 42b derives the difference time between the estimated charging time and the set charging time set as the time for which the external charging of the battery 10 is performed. The executer 42c performs the external charging of the battery 10 such that the battery 10 is cooled throughout the difference time and the battery 10 is charged throughout the estimated charging time. Accordingly, an increase of the duration of a high SOC of the battery 10 due to the deterioration of the battery 10 can be reduced in the external charging, and heat generation from the battery 10 can be reduced, thus enabling the deterioration of the battery 10 to be decelerated.

The executer 42c in the charging control device 40 according to this embodiment may cool the battery 10 in the external charging before charging the battery 10. The cooling of the battery 10 before the charging enables the battery temperature to be lowered, thus enabling the heat generation from the battery 10 during the charging to be reduced effectively. The reduction in the heat generation thus enables the deterioration of the battery 10 to be decelerated more effectively.

The first deriver 42a in the charging control device 40 according to this embodiment may derive the estimated charging time based on the current maximum capacity of the battery 10 serving as the battery information. Such deriving enables the estimated charging time to be derived appropriately based on the degree of deterioration of the battery 10.

The first deriver 42a in the charging control device 40 according to this embodiment may use the maximum capacity of the battery 10 in the previous external charging as the current maximum capacity of the battery 10. Such use enables the current maximum capacity to be decided appropriately, thus enabling the estimated charging time to be derived more appropriately based on the maximum capacity.

The first deriver 42a in the charging control device 40 according to this embodiment may derive the estimated charging time based on the remaining capacity of the battery 10 at the start time point in the external charging, the remaining capacity serving as the battery information. Such deriving enables the estimated charging time to be derived appropriately based on the state at the start time point of the charging of the battery 10 in the external charging.

The embodiment of the disclosure has heretofore been described with reference to the attached drawings. It goes without saying that the disclosure is not limited to the embodiment described above and that various changes and modifications without departing from the scope of claims belong to the technical scope of the disclosure.

For example, steps described herein by using the flowchart is not necessarily to be performed in the order in the flowchart. Some of the steps may be performed in parallel. An additional step may be used, and at least one of the steps may be omitted.

The charging control device 40 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of charging control device 40 including the acquirer 41, the controller 42, and the memory 43. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A charging control device comprising:
an acquirer configured to acquire battery information regarding a battery;
a first deriver configured to derive an estimated charging time estimated as time to be taken to charge the battery in charging of the battery, the estimated charging time being derived based on the battery information;
a second deriver configured to derive a difference time between the estimated charging time and a set charging time set as time for which the charging of the battery is to be performed; and
an executer configured to perform the charging of the battery such that the battery is to be cooled throughout the difference time and the battery is to be charged throughout the estimated charging time.

2. The charging control device according to claim 1, wherein the executer is configured to cool the battery in the charging before the battery is to be charged.

3. The charging control device according to claim 1, wherein the first deriver is configured to use a current maximum capacity of the battery as the battery information.

4. The charging control device according to claim 2, wherein the first deriver is configured to use a current maximum capacity of the battery as the battery information.

5. The charging control device according to claim 3, wherein the acquirer is configured to acquire a maximum capacity of the battery in previous charging based on a charging result in the previous charging, and
wherein the first deriver is configured to use, as the current maximum capacity of the battery, the maximum capacity of the battery in the previous charging.

6. The charging control device according to claim 4, wherein the acquirer is configured to acquire a maximum capacity of the battery in previous external charging based on a charging result in the previous charging, and
wherein the first deriver is configured to use, as the current maximum capacity of the battery, the maximum capacity of the battery in the previous charging.

7. The charging control device according to claim 1, wherein the first deriver is configured to use, as the battery information, a remaining capacity of the battery at a start time point in the charging.

8. The charging control device according to claim 2, wherein the first deriver is configured to use, as the battery information, a remaining capacity of the battery at a start time point in the charging.

9. The charging control device according to claim 3, wherein the first deriver is configured to use, as the battery information, a remaining capacity of the battery at a start time point in the charging.

10. The charging control device according to claim 4, wherein the first deriver is configured to use, as the battery information, a remaining capacity of the battery at a start time point in the charging.

11. The charging control device according to claim 5, wherein the first deriver is configured to use, as the battery information, a remaining capacity of the battery at a start time point in the charging.

12. The charging control device according to claim 6, wherein the first deriver is configured to use, as the battery information, a remaining capacity of the battery at a start time point in the charging.

13. A charging control device comprising circuitry configured to acquire battery information regarding a battery, derive an estimated charging time estimated as time to be taken to charge the battery in charging of the battery, the estimated charging time being derived based on the battery information, derive a difference time between the estimated charging time and a set charging time set as time for which the charging of the battery is to be performed, and perform the charging of the battery such that the battery is to be cooled throughout the difference time and the battery is to be charged throughout the estimated charging time.

* * * * *